United States Patent
Zhang et al.

(10) Patent No.: US 7,491,416 B2
(45) Date of Patent: *Feb. 17, 2009

(54) MICROWAVE HEATING ATTACHMENT

(75) Inventors: Hua Zhang, New Milford, CT (US); Brita F. Sheehan, New Milford, CT (US); Mark A. Williamson, New Milford, CT (US); Robert Croft, Jersey City, NJ (US); Martin Short, Brooklyn, NY (US)

(73) Assignee: Nestec S.A., Vevey (CH)

( * ) Notice: Subject to any disclaimer, the term of this patent is extended or adjusted under 35 U.S.C. 154(b) by 396 days.

This patent is subject to a terminal disclaimer.

(21) Appl. No.: 10/790,814

(22) Filed: Mar. 3, 2004

(65) Prior Publication Data

US 2005/0196491 A1   Sep. 8, 2005

(51) Int. Cl.
*B65B 11/00* (2006.01)
(52) U.S. Cl. .................. 426/107; 426/111; 426/115; 426/118; 426/122; 219/729; 219/730; 219/732
(58) Field of Classification Search ................ 426/234, 426/113, 122, 118, 107, 243; 219/732, 730; 99/DIG. 14
See application file for complete search history.

(56) References Cited

U.S. PATENT DOCUMENTS

| | | | | |
|---|---|---|---|---|
| 1,955,663 A | * | 4/1934 | Wendell et al. | 229/104 |
| 3,271,169 A | * | 9/1966 | Baker et al. | 426/107 |
| 3,547,661 A | * | 12/1970 | Stevenson | 426/243 |
| 3,876,131 A | * | 4/1975 | Tolaas | 229/104 |
| 4,038,425 A | * | 7/1977 | Brandberg et al. | 426/107 |
| 4,096,948 A | * | 6/1978 | Kuchenbecker | 229/104 |
| 4,351,997 A | | 9/1982 | Mattisson et al. | 219/10.55 |
| 4,425,368 A | * | 1/1984 | Watkins | 426/107 |
| 4,505,391 A | * | 3/1985 | Kuchenbecker | 229/208 |
| 4,626,641 A | | 12/1986 | Brown | 219/10.55 |
| 4,661,671 A | * | 4/1987 | Maroszek | 219/730 |
| 4,661,672 A | * | 4/1987 | Nakanaga | 219/729 |
| 4,705,929 A | * | 11/1987 | Atkinson | 219/730 |
| 4,763,790 A | * | 8/1988 | McGeehin | 206/557 |
| 4,820,893 A | * | 4/1989 | Mode | 219/727 |
| 4,826,072 A | * | 5/1989 | Hart | 229/104 |
| 4,877,932 A | * | 10/1989 | Bernstein et al. | 219/730 |

(Continued)

FOREIGN PATENT DOCUMENTS

EP     0 547 185 B1    2/1997

(Continued)

*Primary Examiner*—Drew E Becker
*Assistant Examiner*—Steven Leff
(74) *Attorney, Agent, or Firm*—Bell, Boyd & Lloyd LLP (57) ABSTRACT

A heating attachment for improving uniformity of microwave heating of a food product in a food container. The heating attachment has a microwave shield of microwave-reflective material. An attachment member is configured for attaching the shield to a food container in an operative association in which the container is disposed in a heating space by the shield. In this association, the shield improves the uniformity of microwave heating of a food product within the container. The heating attachment sufficiently surrounds the container in the operative association to capture the container for promoting breakage of the heating attachment when the container is removed therefrom to inhibit or prevent reuse of the heating attachment.

20 Claims, 11 Drawing Sheets

U.S. PATENT DOCUMENTS

| | | | |
|---|---|---|---|
| 4,965,424 A * | 10/1990 | Bagley | 219/730 |
| 5,153,402 A * | 10/1992 | Quick et al. | 219/730 |
| 5,247,149 A * | 9/1993 | Peleg | 219/729 |
| 5,252,793 A * | 10/1993 | Woods | 219/734 |
| 5,288,962 A * | 2/1994 | Lorence et al. | 219/729 |
| 5,310,980 A | 5/1994 | Beckett | 219/709 |
| 5,416,304 A * | 5/1995 | De La Cruz et al. | 219/730 |
| 6,777,655 B2 * | 8/2004 | Zhang et al. | 219/725 |
| 2003/0189042 A1 | 10/2003 | Zhung et al. | |

FOREIGN PATENT DOCUMENTS

| | | | |
|---|---|---|---|
| JP | 06237707 | * | 8/1994 |
| JP | 09-369450 | | 7/1999 |
| WO | WO 92/19511 | | 11/1992 |

* cited by examiner

MICROWAVE HEATING ATTACHMENT

FIELD OF THE INVENTION

The present invention relates to a heating attachment for improving the uniformity of microwave heating. More particularly, the invention relates to heating attachments that can trap a food container with food to be heated and for which reuse can be controlled.

BACKGROUND OF THE INVENTION

Microwave reheating of frozen meals provides convenience for people seeking quick meal solutions because of the rapid thermal energy transfer into the food materials by the microwaves. However, microwave heating of frozen food is, in general, perceived as difficult and has many problems associated with it, such as overcooking of some portions of meals, cold spots, burnt edges and sauce splatter. In many instances, the meal experiences serious burnt spots yet some places are still very cold, even often below 0° C. Furthermore, the concentration of the microwave energy on spots tends to create local boiling of the water contained in the food and/or sauce and therefore splattering off the dish. Many attempts have been made in the past to solve this issue of re-heating frozen food in a more effective way.

It has been proposed in U.S. Pat. No. 4,351,997 to provide a modified form of tray structure to attempt to provide a more even heating of foodstuff in the tray when exposed to microwave radiation. This prior art has a bottom wall of microwave-transparent material and an upwardly-extending peripheral wall that is outwardly curved at its upper end to define a horizontal peripheral rim. The rim is partly or completely coated with a material that is reflective and opaque to microwave radiation, such as aluminum foil. The peripheral wall also is partly or completely coated with the foil material. The effect of this aluminum foil coating on the wall is to provide reflection of microwave energy toward the center of the tray.

U.S. Pat. No. 4,626,641 describes an embodiment in which a similar structure is provided. In addition to the provision of aluminum foil in the side wall of a tray, the foil also extends into the base of the container but leaves a rectangular open area in the bottom wall.

U.S. Pat. No. 5,310,980 relates to a tray useful for the microwave cooking of prepared foodstuff that comprises an outer layer formed of paperboard or molded plastic to which is laminated an inner polymeric film layer. A layer of microwave-reflective material, usually aluminum foil, is positioned between the outer and inner layers in the location of the peripheral wall of the tray and in a pattern in a portion of the bottom wall.

JP 09-369450 relates to a container for a microwave oven that comprises a first microwave reflecting plate placed along a circumferential lateral parts and a second microwave reflecting plates in the base section of the container.

It is apparent from the prior art that attempts have essentially been made to provide energy transmission structures with reflective material placed in locations that enable energy transfer from the edges and corners of the plate to a more central area of the plate. However, experimental trials have shown that these structures are, by themselves, insufficient to overcome the problems of uneven heating. In particular, cold areas are still present in the food despite the presence of these structures. Thus, improvements in these devices are needed and are provided by the present invention.

SUMMARY OF THE INVENTION

The invention is directed to a heating attachment for improving uniformity of microwave heating of a food product in a food container. In the preferred embodiment, a microwave shield of microwave-reflective material is provided. Also, an attachment member is configured for attaching the shield to a food container in an operative association, in which the container is disposed in a heating space within the shield. In this association, the shield improves the uniformity of microwave heating of a food product within the container. Additionally, the heating attachment is configured and sufficiently surrounds the container in the operative association to capture the container for promoting breakage of the heating attachment when the container is removed therefrom to inhibit or prevent reuse of the heating attachment.

Preferably, the shield in the operative association promotes propagation of resonant modes microwaves during the microwave heating in the food product in the container to improve the uniformity of the heating throughout the food product. The shield also preferably extends about a horizontal periphery of the container in the operative association.

A support member of a preferred embodiment, such as a cradle member, captures the container in the operative association to promote breakage of at least a portion of the cradle when the container is removed therefrom. The support member extends beneath the container in the operative association to hold the container elevated above a microwave over floor during the microwave heating. The support member or the microwave shield, or both, can be configured for tearing to remove the container from the heating attachment. Also, the support member and shield can have a low volume, packaging configuration for shipping, and a larger expanded-volume configuration to capture the container in the operative association. The support member and/or shield can be folded to change between with the low-volume and expanded configurations.

Preferably, the heating attachment includes first and second portions that are attached to each other around the container in the operative association to trap and hold the container in the heating space. The attachment member may have a ledge, hook, rim, or other protrusion for positively trapping the container in the heating space in the operative association.

In the operative configuration, preferred shield is configured to generate a microwave resonating layer having a generally horizontal length of up to about 15 cm, an generally horizontal width of up to about 20 cm, and a generally vertical height of between about 1 and 6 cm. Preferably, the resonating layer is arranged so that TE (transverse electric) modes predominantly supported within the food product are $TE_{n,m,l}$ modes, where n, m, l are such that $0 \leq n \leq 2$, $0 \leq m \leq 1$, and $0 \leq l \leq 1$.

Also, in the preferred operative association, a bottom side of the container and heating space is substantially free of the microwave reflective material. The container can include a dish, bowl, or other type of plate or tray, which is preferably used for serving a portion of food while dining. In addition, the shield is preferably disposed substantially adjacent a sidewall of the container in the operative association, and the container can be made of suitable materials, including ceramic or plastic.

A preferred embodiment of a packaged unit includes a heating attachment and a frozen food product configured and dimensioned for reception in the container for microwave heating. A package contains the heating assembly and frozen food product. Where more than one unit of the frozen food product is packaged, preferably at least that number of heating attachments are also packaged therewith.

The present invention allows reuse of a plate or other container for serving eaters at a table, with a low cost and preferably single-use and disposable heating attachment that provides better and more uniform microwave heating.

DETAILED DESCRIPTION OF THE PREFERRED EMBODIMENTS

The present invention relates to a device and method for improving heating of food in a microwave oven. The invention addresses the problems of cold spots, uneven heating and splattering that traditionally occur when foods are heated in a microwave oven. In particular, the present invention proposes a method for handling and evenly heating frozen food that can be economically, conveniently and rapidly served in a foodservice location to the consumer. The invention also relates to a stand-like device adapted to receive a food container for improving the reheating of the food in a microwave oven.

The present invention aims at providing a satisfactory solution for evenly heating a frozen food in a plate by adopting a different approach where not only energy transfer is carried out but more importantly a modification of the overall heating pattern inside the food block is achieved by changing the wavelength inside the food. Thus, the present invention aims at providing a convenient and easy way for improving microwave reheating of food while enabling the use of standard dishes such as ceramic and ceramic-like plates that are commonly be found in restaurants, cafeterias, hotels, or other foodservice locations.

The present invention relates to a method for ensuring a more uniform heating of frozen food by microwaves. This method is conducted by providing food in a portion having a predetermined size and shape and providing a container adapted for receiving and reheating with microwaves the food portion. The container is associated with a cradle so that the peripheral sides of a supporting cavity of the container, which has peripheral sides and a bottom side, are circumferentially shielded by a microwave reflective material with axial and transverse distances that are determined so as to change the wavelength of resonant modes in the supporting cavity. The method includes placing the portion of food in the supporting cavity and heating the food and container with microwaves so as to expose the food to the changed wavelengths of resonant modes in the cavity thereby resulting in a more uniform heating food pattern and a more uniform heating of the food.

It has been surprisingly found that it is possible to render the heating of the food in the container relatively even by shortening the wavelength of the resonant modes inside the cavity of the food, especially for the transverse electric (TE) modes. Shortening of the wavelength and supporting of specific resonant modes can be obtained more specifically by determining the distances that separate the microwave reflective material when placed circumferentially along the side of the container in a manner to promote modes that show a more even electric field distribution.

In a preferred embodiment, the microwave reflective material forms a resonating layer having a transverse dimension of 15 cm or less. Preferably, the transverse dimension of the resonating layer is less than 13 cm, and more preferably from about 10 to 12 cm. Preferably, the axial dimension of the resonating layer is of 20 cm or less, and more preferably of less than 18 cm.

Therefore, the resonating layer can be regarded as a resonator or wave guide where shortened standing waves occur inside the food. As the transverse dimension of the resonating layer is shortened, transverse electric ("TE") modes which carry more power than transverse magnetic ("TM") modes are propagated in the cavity of the food. In particular, the TE modes that are permitted for the selected geometry are those with a more concentrated heating in the center area of the cavity. More preferably, TE modes that are predominantly supported in the food cavity are $TE_{n,m,l}$ modes wherein n may be 0, 1, or 2, m may be 0 or 1, and l may be 0 or 1.

Preferably, the microwave reflective material forms a resonating layer having a closed rounded contour. Even more preferably, the resonating layer has an oval contour with an axial dimension of less than 20 mm, preferably less than 18 mm. In an alternative embodiment, the resonating layer has a circular contour. In a preferred embodiment, the bottom side is completely or substantially free of shielding material. In one embodiment, microwave material can have a small amount of microwave material, preferably at the longitudinal tips of the bottom side, such as where there is a gap adjacent the shielded tip of the bottom side.

Remarkable results have been obtained by using such shapes and dimensions of a resonating layer. Comparative trials have shown that these are the preferred configurations for evenly heating food in the container.

The invention also relates to a method of using a container having the resonating layer as previously defined wherein, prior to placing the food portion in the container, the food portion is removed frozen from a package of defined shape and size which are predetermined to substantially match the shape and size of the cavity of the container. The frozen food can be produced and packaged in the manufacturing facility according to specific standards of size and shape that are predetermined to provide optimal re-heating properties afterwards. The food product may be packaged in a package that is not the final heating tray with its resonating layer so as to reduce the packaging costs. Contrary to the package, which may usually be disposable, the final heating tray may be a dish made of a non-disposable material for repeated uses in a foodservice location such as a restaurant, a fast-food or a cafeteria, with a disposable cradle to improve the microwave heating.

U.S. Patent Application Publication U.S. 2003/0189042 A1 ("the '042 publication"), the entire content of which is hereby incorporated herein by reference thereto, teaches a method and devices for uniform microwave heating of food in a container. The present invention provides a removable attachment for a food container that employs a microwave shield as disclosed in the '042 publication.

The method of the invention aims at providing a solution for re-heating a frozen food product of predetermined size and shape in a plate, which is placed within the inventive heating attachment that is adapted for modifying the wave pattern during a microwave heating process in a manner that enables the transverse electric (TE) modes of higher power and more evenly distributed pattern to propagate inside the food product. The present invention aims at providing a method for quickly and evenly reheating food, preferably frozen food, with microwaves, preferably those provided by a conventional microwave oven that is 2450 MHz.

Figure 1:
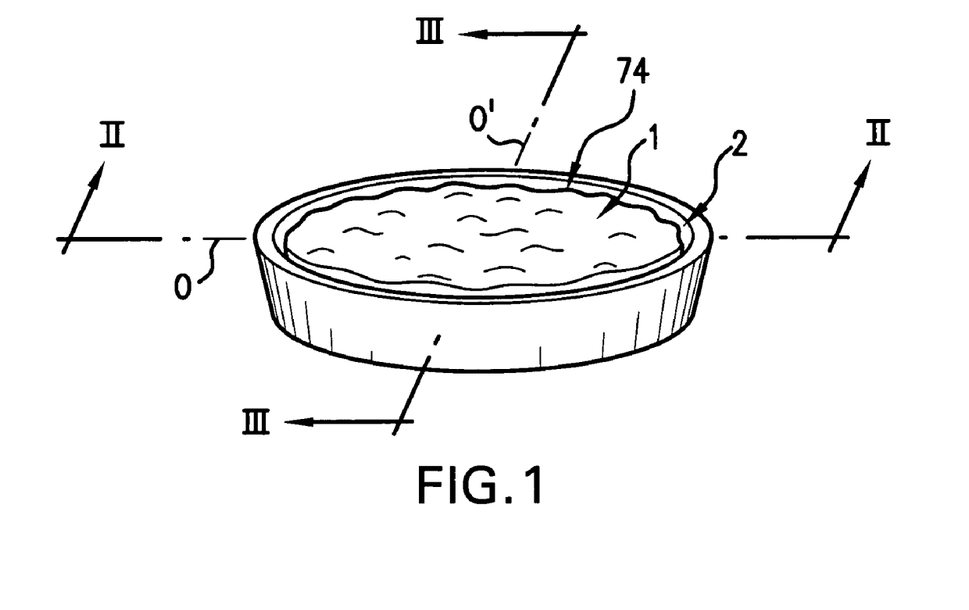
FIG. 1 is a diagrammatic, perspective view of a plate and microwave shield adapted to form a resonator of shortened wavelength with a frozen food product ready for microwave heating according to the invention.
Figure 2:
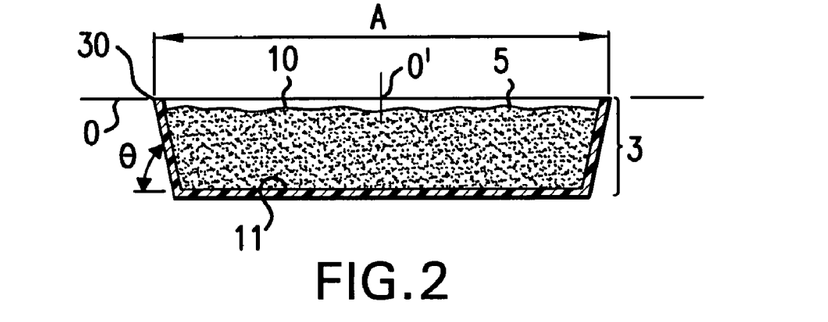
FIG. 2 is a cross-sectional view along line II-II of FIG. 1.
Figure 3:
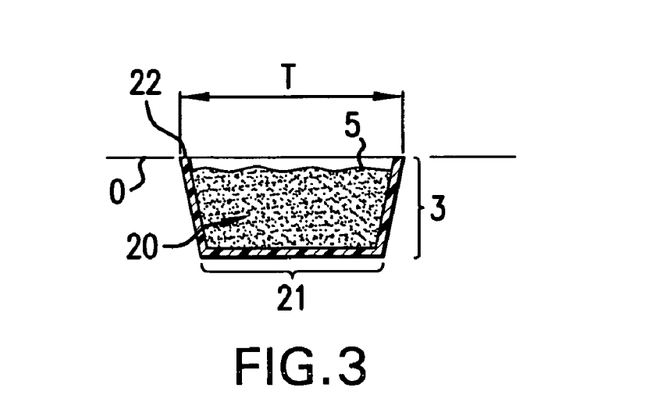
FIG. 3 is a cross-sectional view along line III-III of FIG. 1.

Referring to FIGS. 1-3, a preferred embodiment employs a food portion 1 that is frozen, placing the food portion in a supporting cavity 20 of a tray or plate 2 for heating the food portion in a microwave oven. The food may be any kind of food meal, such as pasta, including lasagna, rice, fish, meat, soup, and vegetables with or without sauce, and combinations thereof and other foods. The plate 2 includes a bottom portion 21 and upwardly oriented side portions 22 that together define the cavity for receiving the food portion 1. The plate is preferably formed, at least partly, from a material that is substantially transparent to microwave so as to avoid microwave energy loss in the material but to be sufficiently rigid to support the weight of the food without significant deformation and to maintain the side portions extending generally upwardly. The material for the plate is preferably chosen from ceramic, porcelain, glass, cardboard, polymer material, and combinations thereof.

Figure 4:
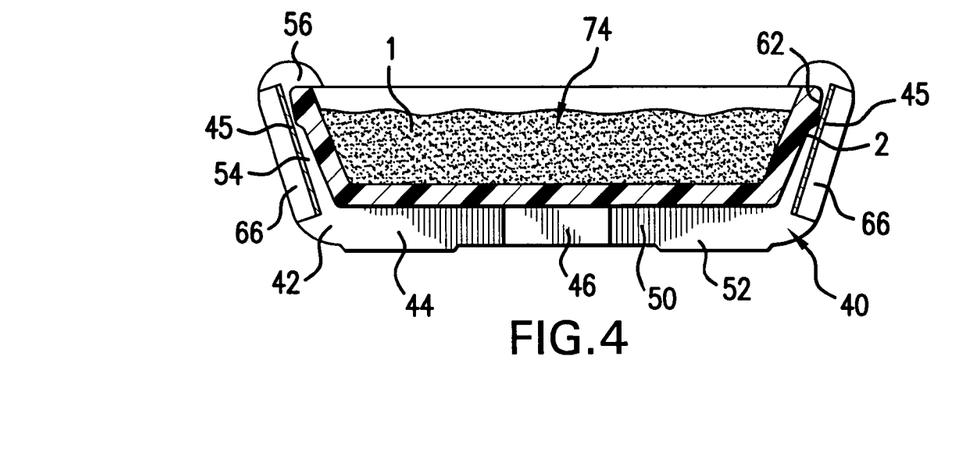
FIG. 4 is cross-sectional view of an embodiment of a heating attachment and plate for re-heating a frozen food.
Figure 5:
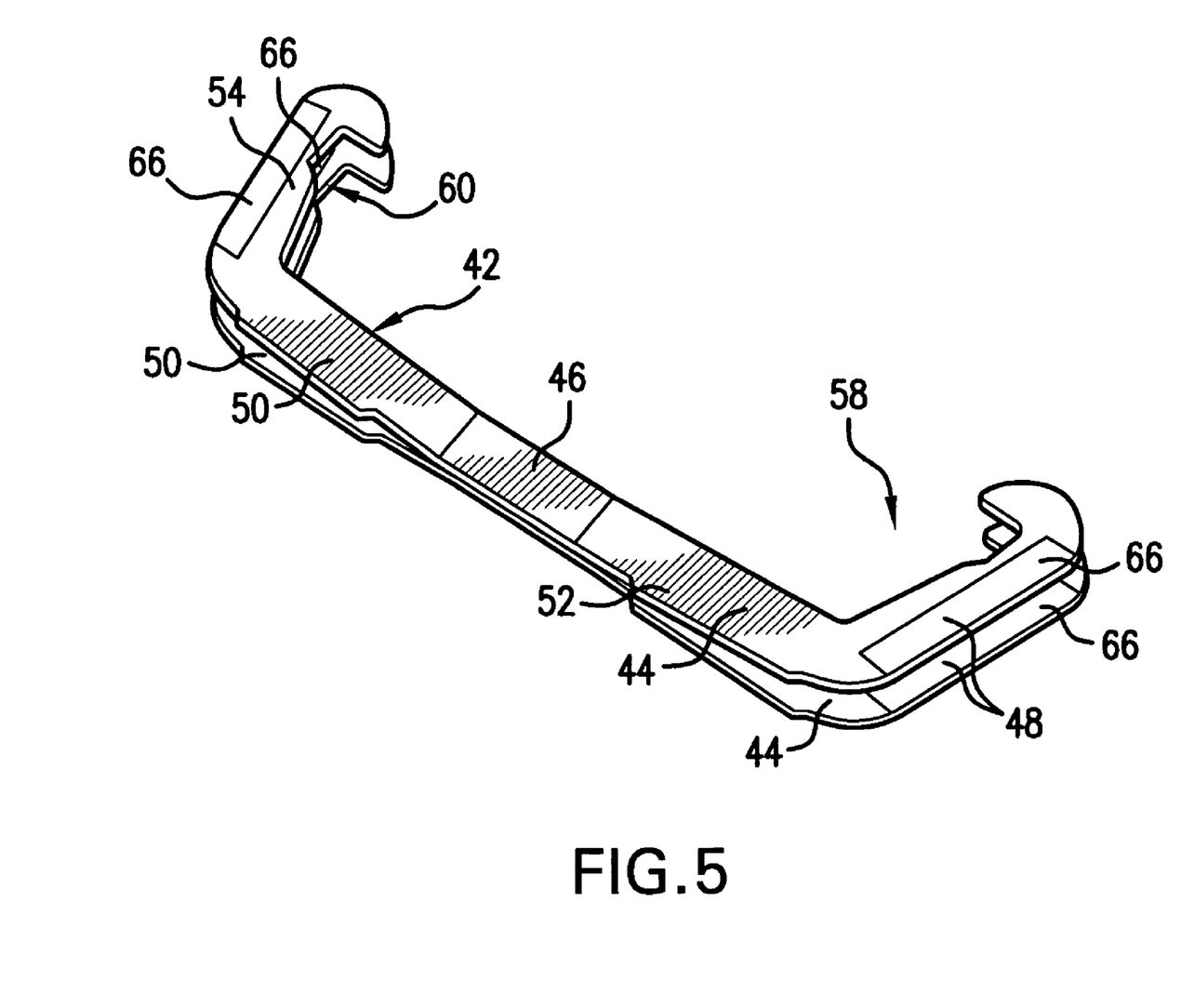
FIG. 5 is a perspective view of a cradle thereof.

Referring to FIG. 4, a preferred embodiment of a heating attachment 40 is shown attached to a plate 2 to improve the uniformity of microwave heating of the food portion 1. The heating attachment 40 includes a cradle 42 and a microwave shield 45, which are configured for attaching to the plate 2. Cradle 42 includes two cradle portions 44 that are attached together, preferably fixed, such as by adhesion, at a connected location 46. Longitudinal ends 48 of the cradle portions 44 are pivotable with respect to each other to position closely against the plate 2. The cradle portions 44 have base portions 50, preferably with feet 52, to support the plate 2 when attached thereto. Side members 54 extend generally upwardly and include hooks or ledges 56.

The cradle 42 defines an interior recess 58 configured and dimensioned to receive and clasp the plate 2. Preferably, the interior recess 58 is defined by similar interior recesses in each of the cradle portions 44 and has a shape corresponding substantially closely with the exterior shape of the plate 2 to be clasped when the cradle portions 44 are spread to an open cradle position, as shown in FIG. 4.

The cradle 42 includes several portions for preventing extraction of the plate 2 from the interior recess 58 in various directions. Hooks 56 prevent upward extraction, the base portions 50 prevent downward extraction, and side members 54 prevent horizontal extraction. With the cradle portions 44 spread in an X-shape in the open cradle position, the cradle portions 44 prevent extraction of the plate in substantially any horizontal direction, and also provide a stable base formed by the two spread base portions 50. The interior recess 58 preferably closely corresponds to the external shape of the plate 2. For instance, in the embodiment shown, the side members 54 are angled similarly to the outer wall of the plate 2, and include rim receiving portions 60 that cooperatively receive an upper rim 62 around the top opening of the plate 2.

Figure 6:
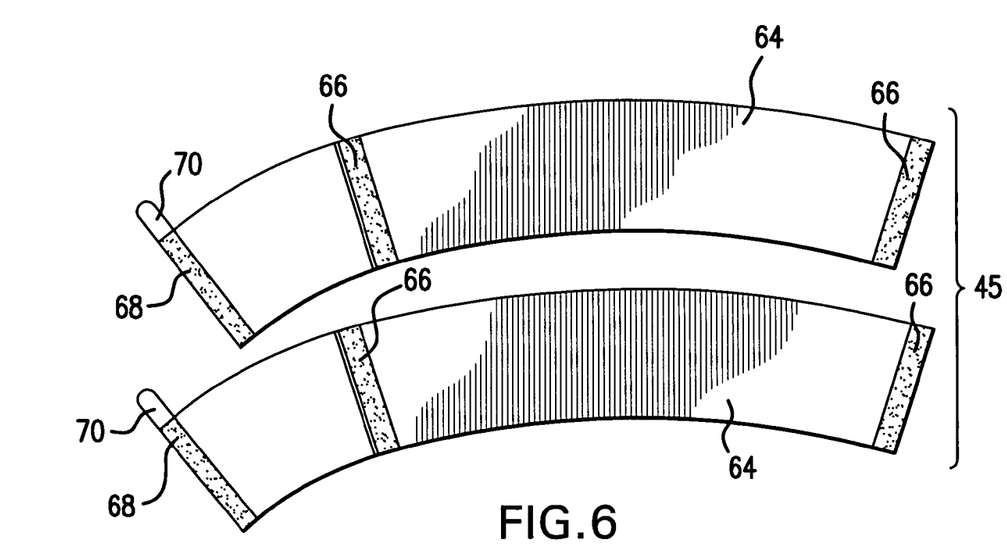
FIG. 6 is side view of a microwave shield thereof.

The microwave shield 45 of this embodiment includes two shield portions 64, as shown in FIG. 6. Preferably, each shield portion 44 includes an elongated band or strip of microwave-reflective material that can have a curvature to extend in a preselected manner around the plate 2. In the embodiment shown, the curvature is selected so the bands are horizontal when placed around the tapered sidewall of the oval plate. Thus, the curvature is greater near the longitudinal ends of the oval shape.

Adhesive is provided on one or both of the cradle 42 and shield 45 for adhering the shield 45 to the cradle 42, preferably at locations 66,68. One location 66 is preferably at a longitudinal end of the band, and the other is in an intermediate portion. Location 68 is preferably at an end of the band, and preferably includes a reinforcing member 70 that protrudes above the band for ease of manipulation.

Figure 7:
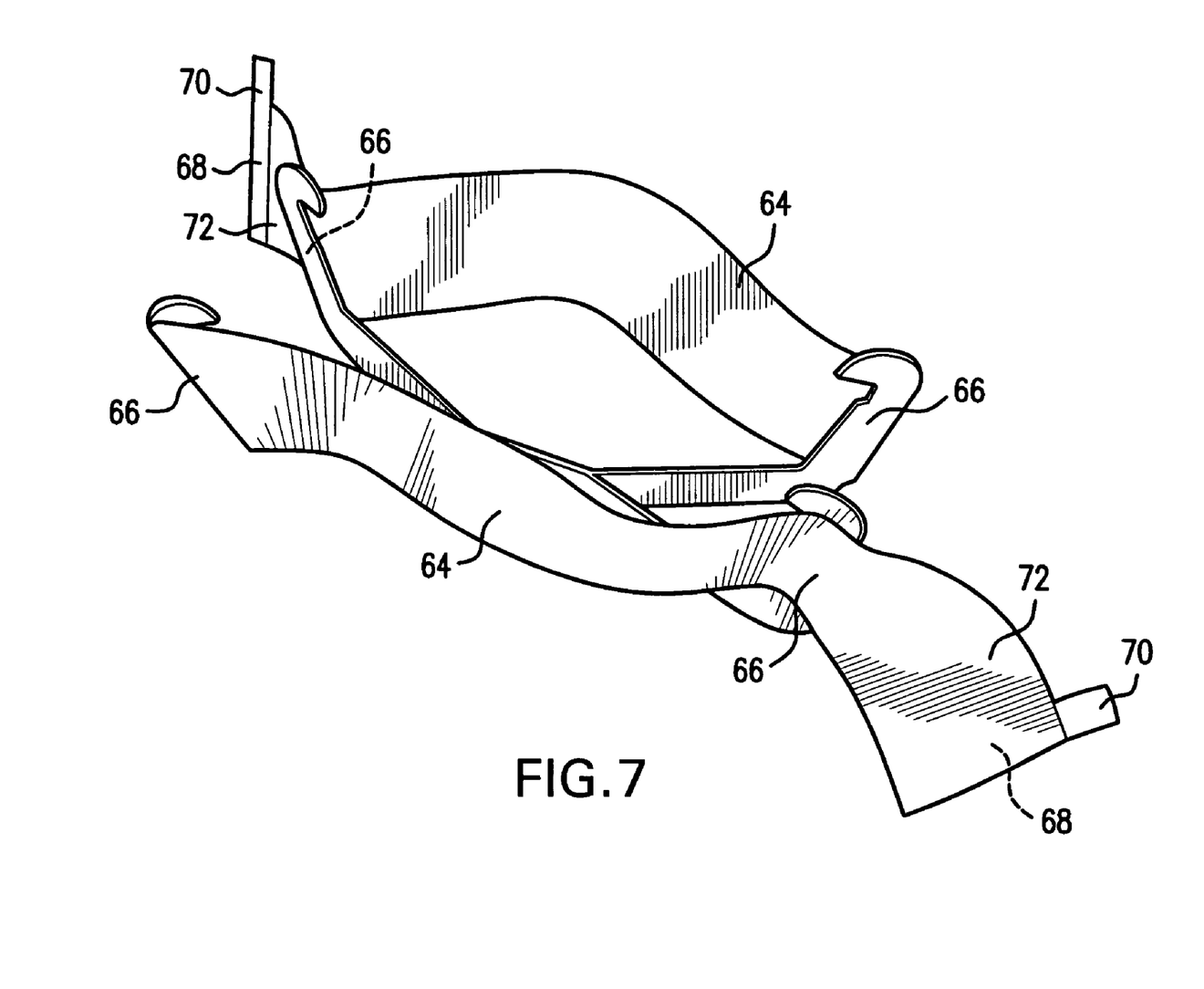
FIG. 7 perspective view of the embodiment of FIG. 4 prior to receiving the plate.

FIG. 7 shows a state of assembly in which the heating attachment 40 is preferably shipped, such as packaged along with a frozen food portion 1 that is frozen in a shape to fit, preferably easily and closely, within the plate 2 or the predetermined shape. In this state of assembly, the shield portions 64 are each attached to the side members 54 of preferably only at locations 66 and to one of the cradle portions 44, and preferably only along the sides corresponding to the longer sides of the oval shape of the plate 2.

Figure 8:
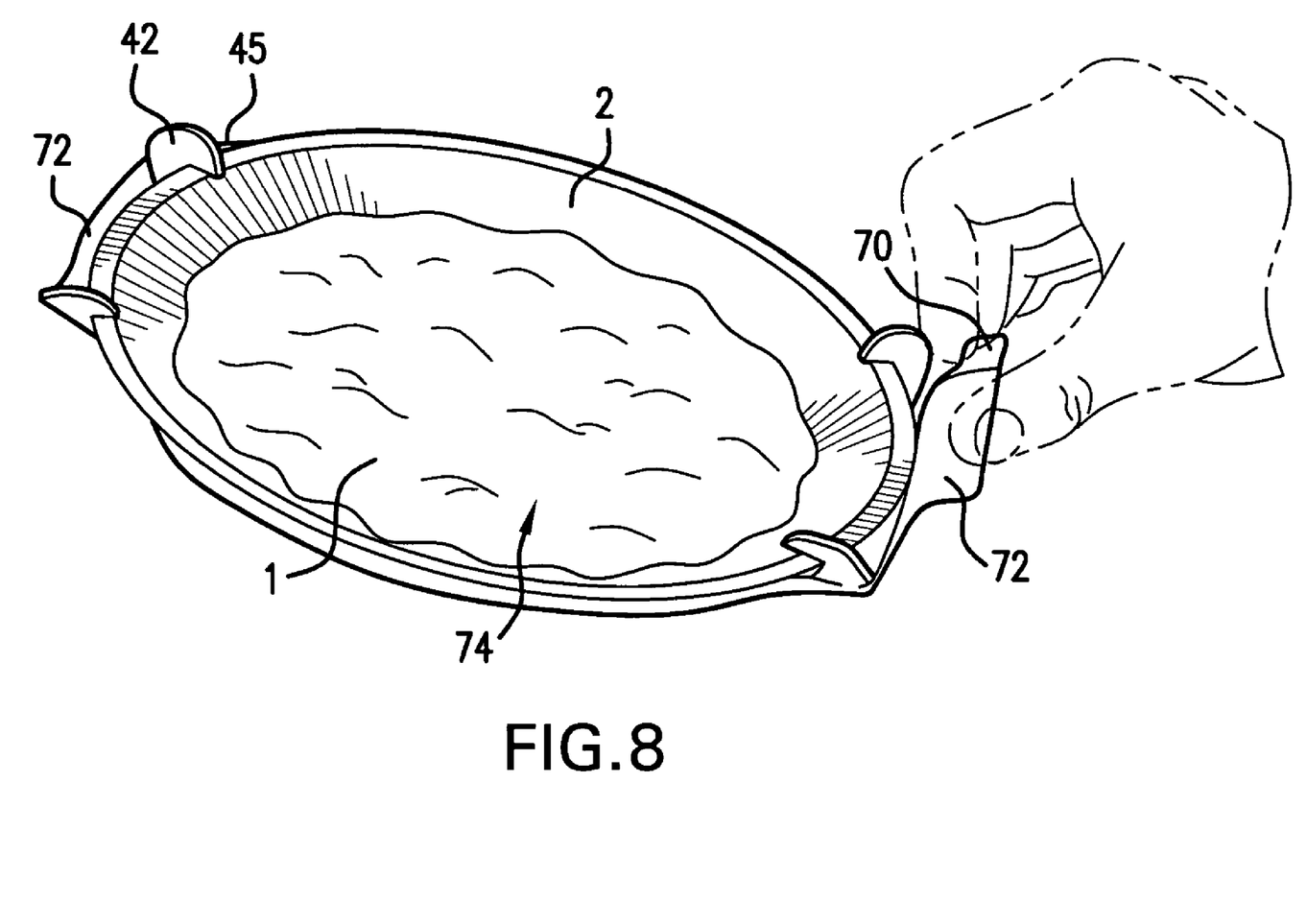
FIG. 8 is a perspective view of the heating attachment and plate in an operative association for heating the food therein.
Figure 9:
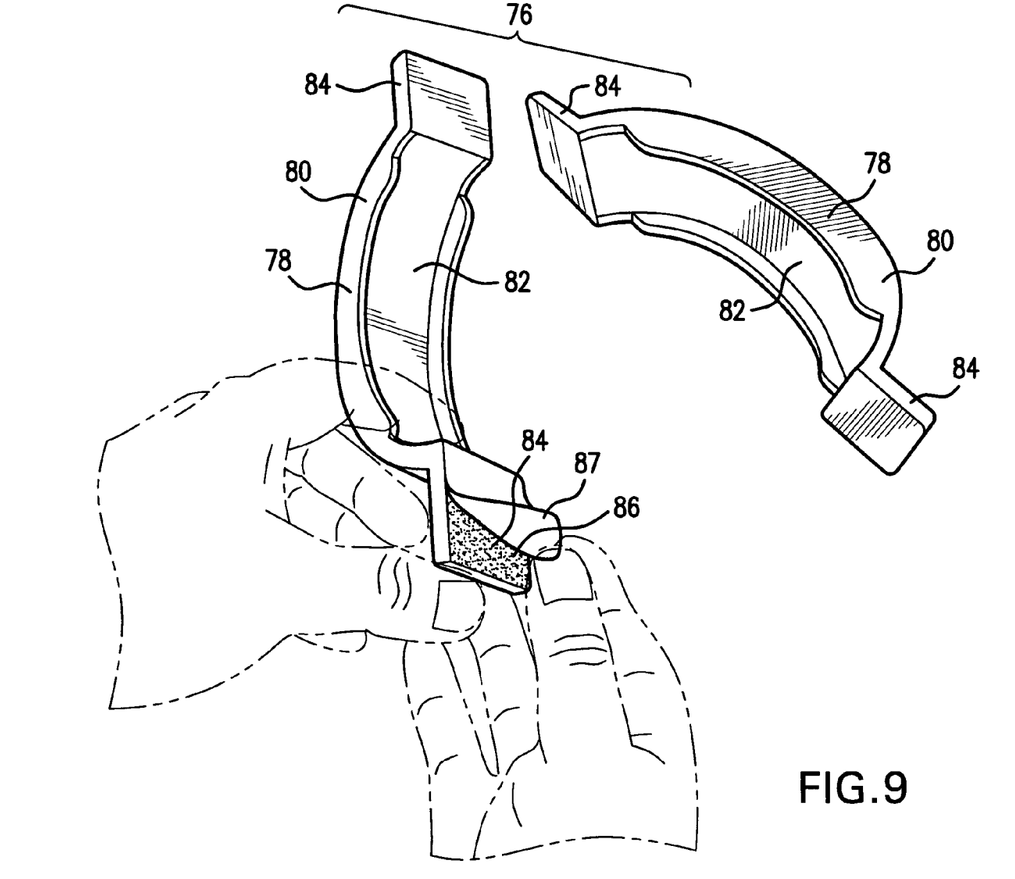
FIG. 9 is a perspective view of another embodiment of a heating attachment prior to assembly.
Figure 10:
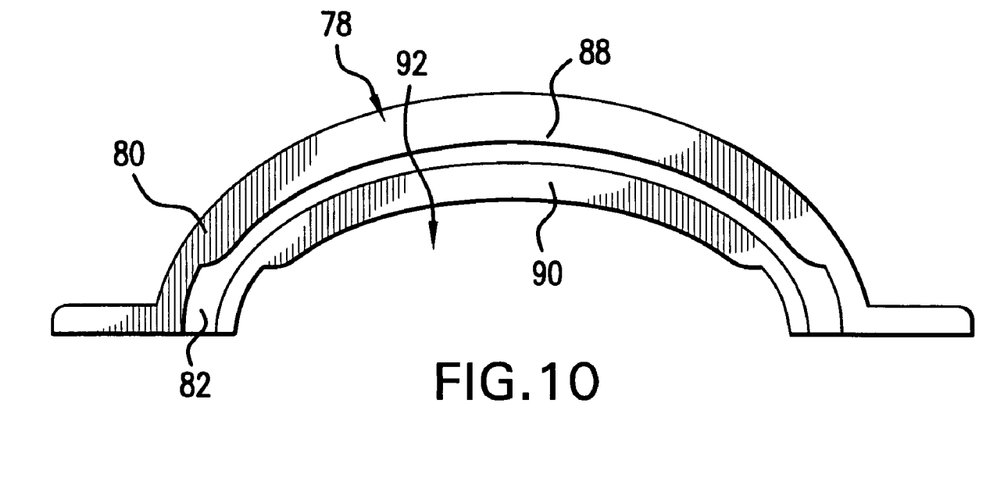
FIG. 10 is a top view of a cradle portion thereof.
Figure 11:
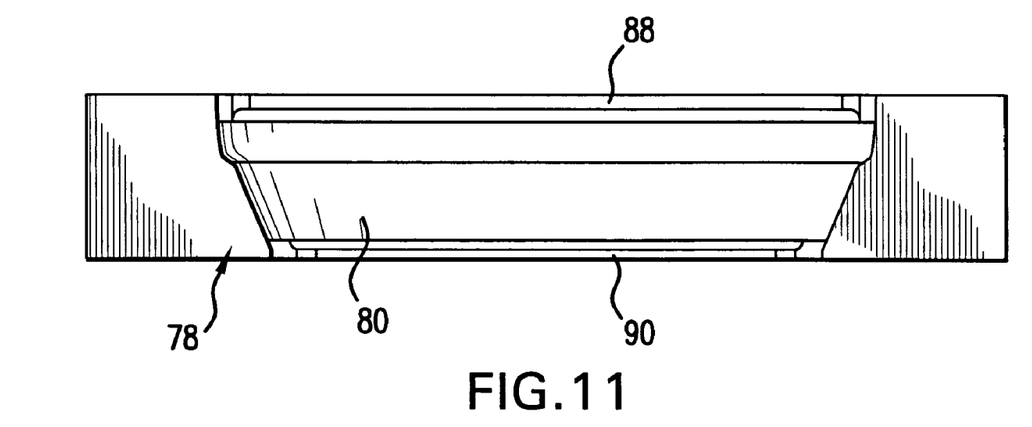
FIG. 11 is an inner-side view thereof.

The plate is loaded into the heating attachment 40 with end flap portions 72 of the shield 45 still awaiting needing final attachment, preferably at one end. As shown in FIG. 8, once the plate 2 is positioned in the cradle 42, the end portions 72 are attached to the respective cradle portion 48 at locations 66,68, preferably by an adhesive. In the closed and operative position shown in FIG. 4, in which the shield 45 closed and fixed around the plate 2, the heating attachment 40, in this embodiment, via the cradle 42 and shield 45 cooperatively, sufficiently surrounds the plate 2 to clasp the plate 2. The plate 2 is thus preferably clasped in such a manner to promote or require breakage of the attachment to remove the plate 2 therefrom. This inhibits reuse of the attachment 40 when the container is removed therefrom to inhibit or prevent reuse of the attachment 40. Thus, each attachment member can be shipped with the frozen food product in the shape of the plate 2 to be used, and construction of the attachment 40 can be merely sufficient to last for a single application. In this embodiment, the shield 45 or cradle 42 or both may be torn to remove the heated plate 2.

When the heating attachment 40 is operatively attached to the plate 2, the plate 2 and the food 1 are positioned in a heating space 74. In this position, the shield 45 is associated with and positioned with respect to the food 1 in the plate 2 disposed in the heating space 74 such that the shield 45 improves the uniformity of microwave heating of a food product within the container.

The cradle 42 is preferably made of semirigid paperboard or of a plastic that can be bent by hand to spread the cradle portions 44. Other materials, such as plastics and other preferably microwave-transparent materials can alternatively be used. The preferred material for the microwave shield 45 is aluminum foil, although other materials can be used. The preferred material is flexible and capable of readily being torn by hand.

Figure 12:
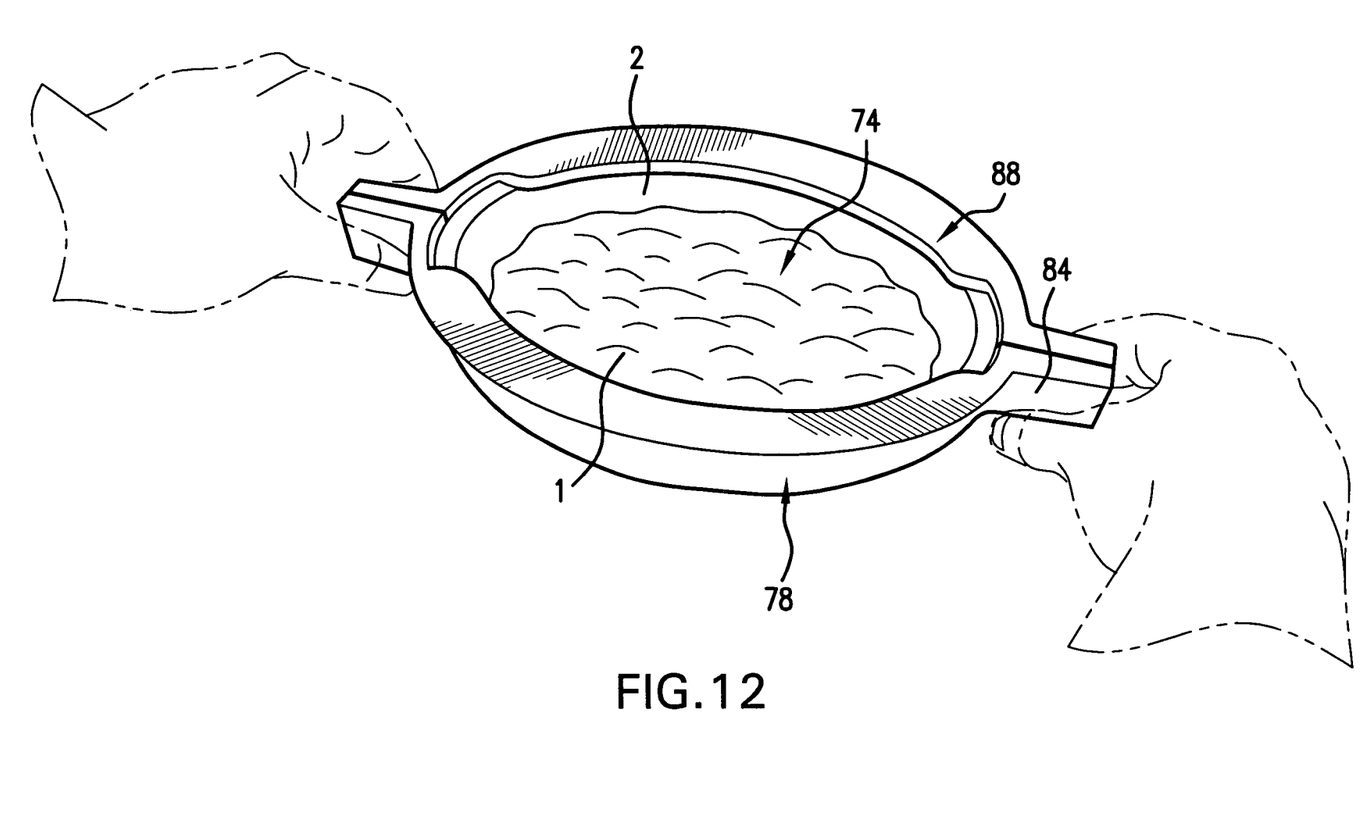
FIG. 12 is a perspective view thereof in operative association with a plate containing a food portion.

Another embodiment is shown in FIGS. 9-12 and includes a heating attachment 76 with two attachment halves 78 formed as shells to cooperatively capture and hold the plate 2. Each half 78 has a cradle portion 80 providing a support structure, on an internal side of which a microwave shield 82 is mounted, preferably by an adhesion. The cradle portions preferably include handle extensions 84 that preferably include attachment surfaces 86, preferably with an adhesive or other attachment member disposed to connect to the opposed cradle portion 80 when the plate 2 is placed in the heating space 74. The adhesive on the attachment surfaces 86 can be covered with a removable film 87 to cover the adhesive until the halves 78 are fixed to each other. The adhesive surfaces and handle extensions 84 preferably are oriented generally upright and are configured so a user can squeeze the opposing extensions 84 against each other using two hands, as shown in FIG. 12.

The halves 78 preferably have upper and lower ledges 88,90 or other surfaces to capture and hold the plate 2 in the heating space 74 when the halves 78 are adhered together. To facilitate insertion of the plate 2, the halves are split at the longitudinal ends of the heating space 74. The microwave shield 80 is provided along the inside of the interior recess 92 of the halves 78 and preferably extends horizontally around the heating space 74, leaving the bottom and top sides substantially open or substantially free of microwave-reflective material.

Once the halves 78 are attached to each other, the attachment captures the plate 2, and the attachment preferably has to be broken to release the plate 2, preferably rendering the attachment non-reusable. In this embodiment, the cradle portions are preferably made of a frangible foam material that is significantly weaker than the adhesive so that the foam and shield 80 brake when the plate 2 is removed, although other suitable materials can be used.

Figure 13:
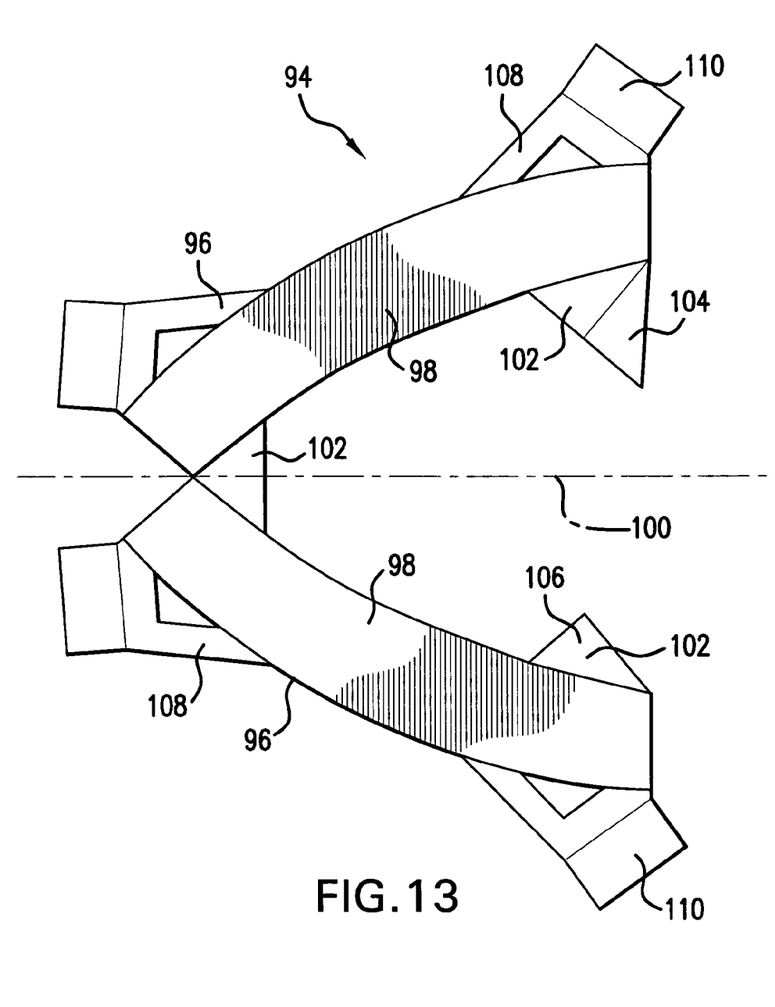
FIG. 13 is a top view of another embodiment of a heating attachment in a low volume, unassembled configuration.

Referring to the embodiment of FIG. 13, heating attachment 94 includes a cradle 96, such as of paperboard or a plastic. Microwave shield 98 is attached along an elongated portion of the cradle 94 so the cradle 96 provides a degree of stiffness to the shield 98. The cradle is preferably symmetrical about a longitudinal axis 100 but can have other shapes depending on the shape of the plate 2 to be held.

Figure 14:
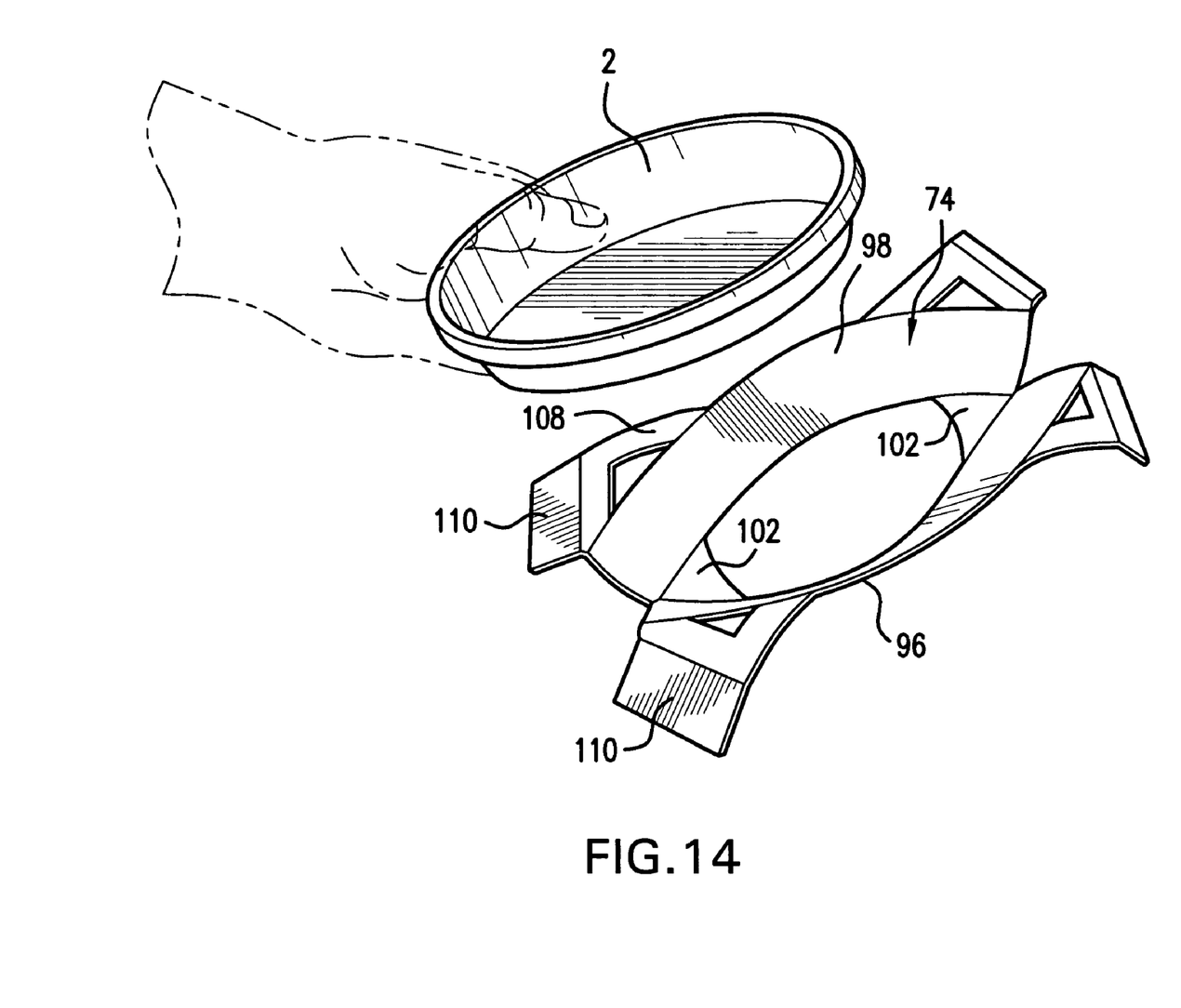
FIG. 14 is a perspective view thereof partially assembled to receive a plate.
Figure 15:
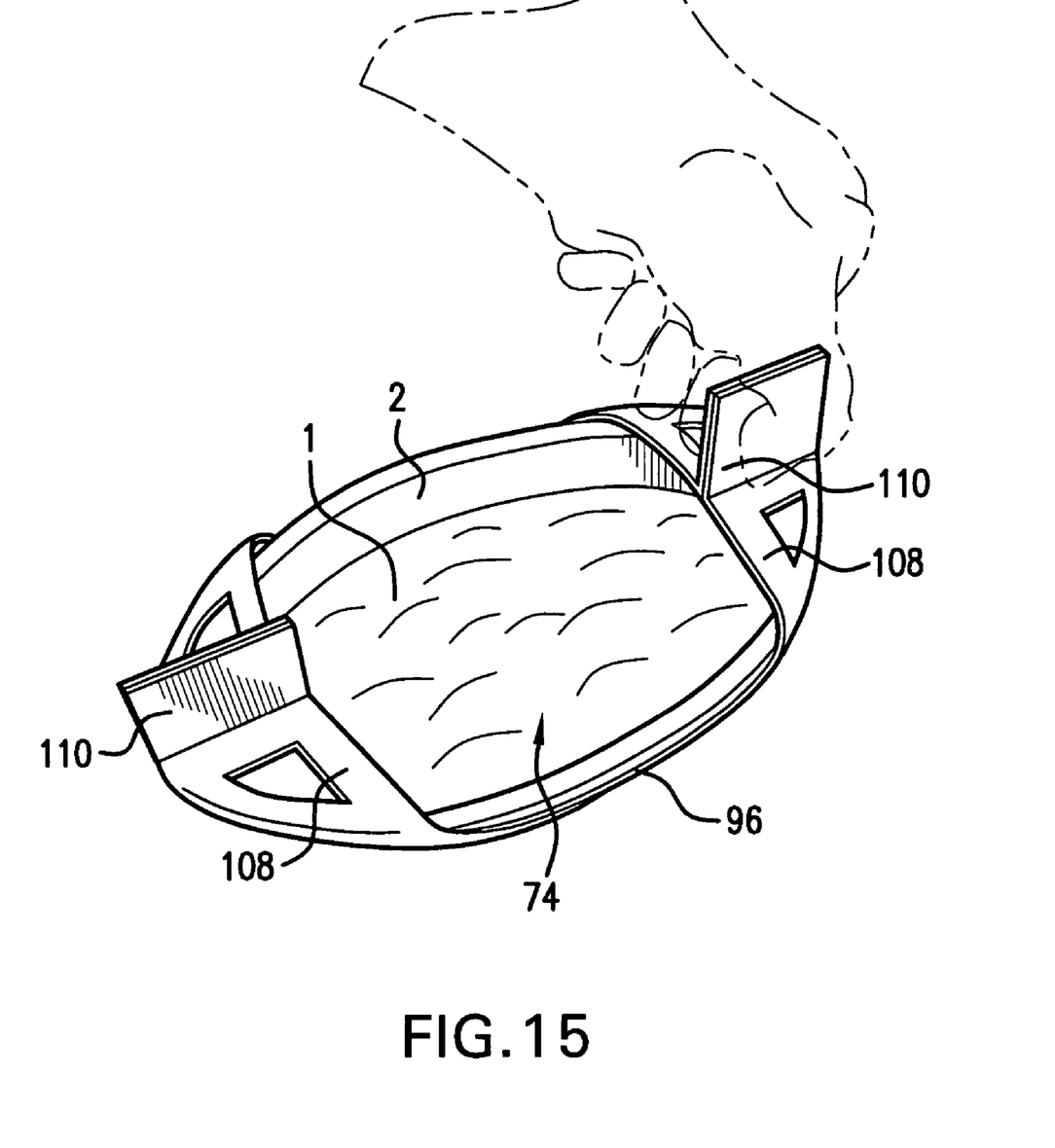
FIG. 15 is a perspective view thereof in operative association with the plate for heating the food contained therein.

Bottom portions 102 of the cradle are configured to prevent downward extraction of the plate 2 from the heating attachment 94 when associated with the plate 2. An attachment extension 104, preferably having adhesive, is provided to connect to the tab 106 of its opposite bottom portion 102, as shown in FIG. 14. Upper portions 108 are configured to prevent upward extraction of the plate 2. Preferably attached to the upper portions 108 are handle extensions 110, which also can include adhesive to attach to the corresponding handle extension 110 or other suitable portion disposed opposite therefrom to close the attachment member 94 about the plate 2 in the operative association. As in the other embodiments, the attachment preferably is torn after heating of the food 1 to prevent or hinder reuse, although in an alternative embodiment, the heating attachment may be conducted for removing it from the plate without destroying the heating attachment.

The microwave shield can extend along bottom portions 102 as well, to provide a more continuous microwave shield around the food product to improve the uniformity of the microwave heating. Even if the shield does extend along bottom portions 102, the coverage on the bottom side of the plate 2, if any, is minor compared to the total area of the bottom side, and the substantial majority of the bottom side preferably remains free of microwave reflective material. Preferably less than about 80%, more preferably less than about 90%, and most preferably less than about 95% of the total bottom side area is shielded with microwave reflective material. In one embodiment, the microwave shield has a small lip that extends over a small distance on the bottom side along most of the periphery thereof.

In the preferred embodiments, in the operative position, the shield promotes propagation of resonant modes of the microwaves in the food product that is in the container in the heating space to improve the uniformity of the microwave heating throughout the food product. Also, the preferred attachment members can be packaged in a low-volume configuration to facilitate shipping. In the embodiments of FIGS. 4 and 13, the attachment members can be shipped substantially flat, and which in the embodiment of FIG. 9, the two halves of the attachment can be placed with their recesses facing in a same direction to achieve at least partial nesting.

Referring again to FIGS. 1-3, the microwave shield extends to form a circumferential surface 3 made of a material that is reflective to the microwave is provided that is placed adjacent the sidewall 22 of the plate 2. The circumferential surface of reflective material preferably is configured and dimensioned to modify the wavelength in the dielectric food itself. Preferably, the plate 2 has a shape and size that complementarily match the shape and size of the surface 3, although in other embodiments the plate 2 can loosely fit within the closed band 3.

In the diagrammatic embodiment of FIGS. 1-3, the band 3 and the heating space 74 preferably has a shape primarily extending in an elongated manner along major axis O. In such a configuration, it is possible to define an axial distance A that corresponds to a longer distance between the internal surfaces of the band along axial line O. Similarly, the band 3 has a second dimension T that is taken transversally along a transverse axis O' that is substantially oriented orthogonally to a minor axis O, and that preferably passes through the centerline of axial distance A. The transverse distance T represents the distance at this centerline between the internal surfaces of the reflective band as measured at a level of the upper surface of the food.

The distances A and T are preferably measured at the circumference of the band 3 at a level of the upper surface 5 of the food when the food is properly placed in the cavity for re-heating. However, in certain circumstances where the container is shallow and/or has sidewalls that form a low inclination relative to the bottom surface; e.g., the edges of a dinner plate, the food may usually project upwardly beyond the height of the sidewalls. In that event, the circumference for considering distances A and T will be regarded at the upper edge of the resonating layer.

According to one essential aspect of the invention, the distances A and T of the band are determined to provide a shortening of the wavelength when the food plate, as surrounded by the band 3, is heated in the microwave oven. Therefore, reflection or transfer of the microwave beam is not the primary effect that is sought. The primary effect that is sought is related to the modification of the propagation of the waves in the dielectric food material between two or more conductors that support a certain number of electromagnetic waves. These waves have a uniquely defined voltage, current and impedance. Wave guides, often consisting of a single conductor, support transverse electric (TE) and/or transverse magnetic (TM) waves, characterized by the presence of longitudinal magnetic or electric, respectively, field components. Therefore, the principle of the invention is to look at determining the boundaries of the band that acts as a wave guide so that high power TE modes of even density are primarily induced. More particularly, $TE_{nm}$ modes of evenly distributed density such as $TE_{01}$, $TE_{11}$, $TE_{21}$ are primarily supported while $TE_{nm}$ or $TM_{nm}$ modes of less evenly distributed density such as $TE_{31}$, $TE_{41}$, $TE_{51}$ or $TM_{31}$ are preferably discarded.

In order to promote domination of the desired TE modes, it has been found that the transverse distance T of the resonating band should be of about 15 cm or less, preferably lower than about 13 cm, even preferably ranging of about from 6 to 12 cm. Similarly, the axial distance A of the band should be of 20 cm or less, preferably lower than about 18 cm, even preferably ranging of about from 6 to 15 cm. Remarkable and surprising results on the final temperature distribution have been obtained if those distance are properly respected. This effectively changes the wavelength of the resonant modes inside the dielectric cavity of the plate (inside the food), especially for those TE modes. This shortening of the wavelength intensifies the heating in the center of the food, therefore promoting a more uniform heating pattern.

The band may comprise tapered surfaces as shown in FIGS. 2 and 3 that form an angle θ with respect to the bottom of the plate comprised between about 10 and 120 degrees, preferably, about 15 to 90 degrees, and even more preferably about 20 to 85 degrees. In fact, slightly tapering down surfaces promote a better heating. However, a problem in energy transmission in the bottom of the food may occur if the bottom surface of the plate is reduced, e.g., becomes less than about 5 cm. Therefore, regardless of the inclination of the sidewall, the flat bottom of the plate should be maintained at a transverse dimension of at least about 5 cm, and preferably at least 7 cm.

It has also been found that the microwave reflective material band should preferably be a continuous or substantially continuous peripheral band of a height of at least about 10 mm, preferably of from about 10 to 60 mm, even preferably of from about 25 to 45 mm. In embodiments in which the band is discontinuous, gaps in the band can be provided between sections of the band. The gaps are preferably about between 3 mm and 7 mm. Gaps that are too small can cause arcing, while gaps that are too large can reduce the effectiveness of the microwave shield. Any gaps or discontinuities selected preferably are sufficiently large to avoid arcing, while being sufficiently small to preserve the shield's effectiveness. The food should preferably be placed so that its upper surface 10 is placed below the upper line 30 of the band 3, preferably at 0 to 15 mm below, even preferably at 2 to 10 mm below. Similarly, the food lower surface 11 contacting the bottom of the plate should be at a level above the lower line 31 of the band of from about 0 to 10 mm, preferably about 0.5 to 5 mm, and more preferably about 2 to 3 mm.

Although an oval contour is preferred for the band, since the best results have been found with such a configuration, it remains possible to have a band of uneven contour and other shapes such as a circular contour. Where there is a substantially circular contour, the transverse distance T and the axial distance A form a diameter that should be preferentially determined, as for the previous example, to be a distance equal to or less than about 15 cm, preferably less than about 13 cm, even preferably of about from 6 to 12 cm.

The band or layer 3 may preferably comprise a metallic material that is placed adjacent the sidewall 22 of the plate. The band may be either attached or simply positioned in close contact with the outer surface of the sidewall 22. In another embodiment, the band may be positioned adjacent to the inner surface of the sidewall 22 of the plate.

In one embodiment, the band may be a coating material, such as a metal coating, for a cradle or other structural member of the attachment. In order to provide a sufficient microwave resonating effect, the coating has a thickness that preferably is at least about 3.2 microns, and even more preferably of at least about 10 microns. The coating may be applied out by any suitable means such as by vacuum metalizing or chemical etching. Those coating techniques are well known by the man skilled in the art of surface treatment and, therefore, do not need to be described further herein.

The inside volume and shape demarcated by the circumferential band may be determined to match the external volume and shape of the plate and, therefore, can take a variety of possible cross-sectional configurations, such as parallel, frustoconical or a stepped configuration.

The portioning and packaging are preferably carried out in a food manufacturing facility utilizing all hygienic and quality standards required in the food manufacturing art. The food portions are preferably packaged in a pre-formed package that predetermines the final shape and size of each individual food portion that are subsequently re-heated, and for fitting within the plate 2 of predetermined dimensions. Preferably, the pre-formed package comprises at least one and preferably a plurality of packaging cells. The cells forms a plurality of individual cavities wherein each of them have a shape and a size adapted to precisely fit in the cavity of the plate 2 for the microwave re-heating while considering the positioning constraints that have been determined earlier in the present description for obtaining the intended result on uniformity of heating. If the plate and the band has an oval contour, the cavity of the cell should also preferably have an oval contour of predetermined length X and width Y. The dimensions X and Y are measured at the outer surface of the food. The dimensions X and Y are determined to substantially correspond to the internal dimensions of the heating plate 2 it fits in so that no large gaps are left in the cavity between the product and the plate. It has been noticed that large gaps provide the edge of the food a higher than desired heating. Therefore, gaps, if any, between the product and the inner surface of the plate 2 should be of less than about 8 mm, preferably of less than about 5 mm. Even more preferably, there should be no gap at all between the side surface of the dish and the side surface of the food. For example, the contour of the food may have dimensions of X of between about 15 to 19 cm and for Y between about 8 to 15 cm.

The pre-formed package may be made of a thermoformed plastic foil or any equivalent formable material that can retain a given shape after forming. The foil is thermoformed to form the cavities and edges that surround the cavity. The material should advantageously be sufficiently deformable to allow easy removal of the food block from the cell. The preformed package can be a foodgrade polypropylene or any other suitable plastic of from about 0.1 to 1 mm in thickness. A plurality of cell can be formed in a single sheet of plastic as illustrated for cost manufacturing reasons and can be separated along cutting lines, if necessary, or be kept grouped as a collective package, if there is a need for distributing or selling more than one food package at a time.

The cells can be filled in by food to form the food portions. Depending on the food recipes, freezing may be required before filling in the cells. Freezing may be carried out on discrete food components, for instance, pasta layers, vegetable pieces, meat balls, etc., or on the food block itself whereas other components such as sauce, cheese and the like, may be placed, poured or deposited in the cells at ambient or just at chilled temperature.

As a matter of safety, freezing of the filled cells should always be subsequently completed until the whole food portion has reached the frozen temperature range required. The food containing cells are usually rapidly cooled to the required freezing temperatures, i.e., minus 18 to 40° C. Freezing may usually be carried out in a spiral freezer or in a freezing tunnel under liquid nitrogen jets or any other suitable freezing technology. Then, the cells may be closed by thin plastic wrap that is sealed onto the edges of the cells or, alternatively, the preformed package 4 may be simply stacked and packed in a cardboard box with a partition film to separate them in the box.

In another embodiment, the cells may also be made of a flexible non-preformed material such as in thin plastic wrap with the shape and size of the cell's cavity to shape the food portion being defined by an external mould. In that event, the plastic wrap is covered onto the mould surface, the food components are deposited into the plastic wrap and the final block is frozen and removed from the mold.

The advantage of the packaging cells resides in that packaged food blocks can be mass produced in an inexpensive manner that are properly sized to fit the plate 2. The plate 2, which term is used generically to include any suitable container, preferably with side walls to contain the food, and preferably with an open top so that the heated food can be served directly in the plate 2, may be such as a reusable ceramic dish used in restaurant or other foodservice catering areas. The food can, therefore, be transferred from the cell to the ceramic dish to be reheated in a microwave oven and served directly to the consumer in its dish. Thus, the food portion and plate are preferably sized for a single typical serving that a would be consumed in a desired meal. After food consumption, the plate 2 can thus be washed and re-used as a normal dish.

While illustrative embodiments of the invention are disclosed herein, it will be appreciated that numerous modifications and other embodiments may be devised by those skilled in the art. For example, other materials that can be used for microwave-transparent portions include ceramics. Therefore, it will be understood that the appended claims are intended to cover all such modifications and embodiments that come within the spirit and scope of the present invention.

What is claimed is:

1. A heating attachment for improving uniformity of microwave heating of a food product in a container, comprising:
   a shield of microwave-reflective material;
   a cradle configured for attaching the shield to the container in an operative association in which the container is disposed in a heating space surrounded by the shield such that the shield improves the uniformity of microwave heating of a food product within the container; and
   at least one portion that prevents upward extraction of the container from the heating space, the heating attachment sufficiently surrounding the container in the operative association to capture the container for promoting breakage of the heating attachment when the container is removed therefrom to inhibit or prevent reuse of the heating attachment.

2. The heating attachment of claim 1, wherein the shield in the operative association promotes propagation of microwaves resonant modes during the microwave heating in the food product in the container to improve the uniformity of the heating throughout the food product.

3. The heating attachment of claim 1, wherein the shield extends about a periphery of the container in the operative association.

4. The heating attachment of claim 1, wherein the heating attachment has a packaging configuration for facilitating packaging thereof, and an expanded configuration for placement in the operative association, wherein the heating attachment in the packaging configuration has a lower volume than in the expanded configuration.

5. The heating attachment of claim 1, further comprising a support member that captures the container in the operative association to promote breakage of at least a portion of the support member when the container is removed therefrom.

6. The heating attachment of claim 5, wherein the support member extends beneath the container in the operative association to hold the container elevated above a microwave oven floor during the microwave heating.

7. The heating attachment of claim 5, wherein the support member is configured for tearing to remove the container from the heating attachment.

8. The heating attachment of claim 5, wherein the support member and shield comprise a packaging configuration and an expanded configuration, and the heating attachment is configured for folding to move between the packaging and expanded configurations.

9. The heating attachment of claim 1, wherein the heating member comprises first and second portions that are attached to each other around the container in the operative association to trap the container in the heating space.

10. The heating attachment of claim 1, wherein the cradle comprises a ledge for positively trapping the container in the heating space in the operative association.

11. The heating attachment of claim 1, wherein the shield is configured for breaking upon removal of the container from the cradle.

12. The heating attachment of claim 1, wherein the shield in the operative association is configured to generate a microwave resonating layer having a generally horizontal length of up to about 15 cm, a generally horizontal width of up to about 20 cm, and a generally vertical height of between about 1 and 6 cm.

13. The heating attachment of claim 12, wherein the resonating layer is arranged so that TE modes predominantly supported within the food product are $TE_{n,m,l}$ modes, where n,m,l are such that $0 \leq n \leq 2$, $0 \leq m \leq 1$ and $0 \leq l \leq 1$.

14. The heating attachment of claim 1, wherein in the operative association, a bottom side of the heating space is substantially free of the microwave reflective material.

15. The heating attachment of claim 1, wherein the container comprises a dish or bowl for consumption of a food portion.

16. The heating attachment of claim 1, wherein the shield is disposed adjacent a sidewall of the container in the operative association.

17. A heating assembly, comprising the heating attachment and a container, the heating attachment comprising
   a shield of microwave-reflective material,
   a cradle configured for attaching the shield to the container in an operative association in which the container is disposed in a heating space surrounded by the shield such that the shield improves the uniformity of microwave heating of a food product within the container, and
   at least one portion that prevents upward extraction of the container from the heating space, the heating attachment sufficiently surrounding the container in the operative association to capture the container for promoting breakage of the heating attachment when the container is removed therefrom to inhibit or prevent reuse of the heating attachment.

18. The heating assembly of claim 17, wherein the container is made of a ceramic or plastic material.

19. A packaged unit, comprising: the heating assembly of claim 17; a frozen food product configured and dimensioned for reception in the container for microwave heating; and a package containing the heating assembly and frozen food product.

20. The packaged unit of claim 19, wherein the package contains a plurality of frozen food products and at least one heating assembly per frozen food product contained in the package.

* * * * *